(12) United States Patent
Yasuda (10) Patent No.: US 11,590,600 B2
(45) Date of Patent: Feb. 28, 2023

(54) MANUFACTURING METHOD OF JOINED MEMBER

(71) Applicant: FUTABA INDUSTRIAL CO., LTD., Aichi (JP)

(72) Inventor: Keigo Yasuda, Aichi (JP)

(73) Assignee: FUTABA INDUSTRIAL CO., LTD., Aichi (JP)

(*) Notice: Subject to any disclaimer, the term of this patent is extended or adjusted under 35 U.S.C. 154(b) by 102 days.

(21) Appl. No.: 17/202,834

(22) Filed: Mar. 16, 2021

(65) Prior Publication Data

US 2021/0299778 A1    Sep. 30, 2021

(30) Foreign Application Priority Data

Mar. 30, 2020  (JP) .............................. JP2020-060744

(51) Int. Cl.
| | | |
|---|---|---|
| *B23K 11/11* | (2006.01) | |
| *B23K 11/36* | (2006.01) | |
| *B23K 11/16* | (2006.01) | |

(52) U.S. Cl.
CPC ........... *B23K 11/115* (2013.01); *B23K 11/163* (2013.01); *B23K 11/364* (2013.01)

(58) Field of Classification Search
CPC ...... A63F 13/525; A63F 13/57; A63F 13/577; B23K 11/115; B23K 11/163; B23K 11/166; B23K 11/364; G06T 13/40; G06T 15/20; G06T 19/003; G06T 19/20; G06T 2210/21; G06T 2219/2016
USPC ....................................................... 219/118
See application file for complete search history.

(56) References Cited

U.S. PATENT DOCUMENTS

| | | | | |
|---|---|---|---|---|
| 10,040,145 | B2* | 8/2018 | Furusako | ............. B23K 11/115 |
| 11,364,707 | B2* | 6/2022 | Fujita | .................. B23K 10/022 |
| 2015/0174690 | A1 | 6/2015 | Furusako et al. | |
| 2021/0197525 | A1 | 7/2021 | Fujita et al. | |

FOREIGN PATENT DOCUMENTS

| | | |
|---|---|---|
| CN | 104661784 A | 5/2015 |
| JP | 2013035045 A | 2/2013 |
| JP | 2018-192529 A | 12/2018 |

(Continued)

OTHER PUBLICATIONS

Notice of Reasons for Refusal dated Feb. 4, 2022 for corresponding Japanese Application No. 2020-060744.

(Continued)

*Primary Examiner* — Ibrahime A Abraham
*Assistant Examiner* — Joseph W Iskra
(74) *Attorney, Agent, or Firm* — David D. Brush; Westman, Champlin & Koehler, P.A.

(57) ABSTRACT

Provided is a method of manufacturing a joined member that is manufactured by applying resistance welding to a workpiece. The workpiece is provided with plating layers on sides to be in contact with electrodes. In a state in which a first electrode is in contact with a first area in a first plate material that is curved along a contour of a leading end of the first electrode and in which a second electrode is in contact with a second area in a second plate material that is curved along a contour of a leading end of the second electrode, energization between the first electrode and the second electrode is started to form a nugget.

6 Claims, 5 Drawing Sheets

(56) References Cited

FOREIGN PATENT DOCUMENTS

| | | | |
|---|---|---|---|
| JP | 2018192529 | * | 12/2018 |
| WO | 2014045431 A1 | | 3/2014 |
| WO | 2019194308 A1 | | 10/2019 |

OTHER PUBLICATIONS

Office Action dated Apr. 26, 2022 for corresponding Chinese Application No. 202110324884.6.

* cited by examiner

MANUFACTURING METHOD OF JOINED MEMBER

CROSS-REFERENCE TO RELATED APPLICATIONS

This application claims the benefit of Japanese Patent Application No. 2020-060744 filed on Mar. 30, 2020 with the Japan Patent Office, the entire disclosure of which is incorporated herein by reference.

BACKGROUND

The present disclosure relates to a technique for welding a plate material having a plated surface.

Conventionally, resistance welding is used for joining of metal steel plates. When plate materials with plated surfaces, such as hot stamp materials, are joined by resistance welding, plating tends to adhere to electrodes during the welding. Therefore, when welding is successively performed using the same electrode, an amount of plating that adheres to the electrode increases as the number of times of welding (hereinafter, number of spots) increases, and welding defects are likely to occur. In Japanese Unexamined Patent Application Publication No. 2013-35045, a plating layer is softened by energization with an initial current that is lower than a welding current, so as to inhibit adhesion of plating.

SUMMARY

The technique disclosed in Japanese Unexamined Patent Application Publication No. 2013-35045 can soften the plating layer with the initial current. However, since the plating layer cannot be completely eliminated from between the electrode and a welding material, adhesion of plating to the electrode may not be sufficiently reduced. In that case, it is not possible to ensure sufficient number of spots.

In one aspect of the present disclosure, it is preferable that a technique is proposed which can extend life of an electrode.

One embodiment of the present disclosure provides a method of manufacturing a joined member. The joined member is manufactured by holding a workpiece comprising stacked plate materials between a first electrode and a second electrode, and applying resistance welding to the workpiece. In the method, a first plate material of the workpiece that makes contact with the first electrode is provided with a plating layer on a side to be in contact with the first electrode, and a second plate material of the workpiece that makes contact with the second electrode is provided with a plating layer on a side to be in contact with the second electrode. The method comprises, in a state in which the first electrode is in contact with a first area of the first plate material, the first area being curved along a contour of a leading end of the first electrode, and in which the second electrode is in contact with a second area of the second plate material, the second area being curved along a contour of a leading end of the second electrode, starting energization between the first electrode and the second electrode to form a nugget.

In the method as above, since the first area and the second area of the plate materials respectively have shapes along the leading ends of the first electrode and the second electrode (hereinafter, simply referred to as electrodes), the leading end of each electrode makes favorable contact with the plate material, and there is a large area of contact. Since the leading end of the electrode makes favorable contact with the plate material, the area of contact between the electrode and the plate material is less likely to decrease, even if plating adheres to the electrode. Also, since there is a large area of contact between the electrode and the workpiece from the beginning, a rate of change in the area of contact as a whole is small even if a partial decrease or increase in the area of contact occurs due to adhesion of plating to the electrode. For these reasons, change in resistance value between the electrode and the workpiece is reduced even by repeated welding. Thus, for example, as a result that change in voltage is reduced when electric current is constant, change in heat generation amount is reduced. Accordingly, welding defects can be reduced that may occur when the number of spots increases, and the electrode can have a longer life. A contact between the electrode and the workpiece herein includes a contact between the electrode and the workpiece through plating that adheres to the leading end of the electrode.

The aforementioned method may further comprise forming the curved first area in the first plate material and forming the curved second area in the second plate material, before starting energization between the first electrode and the second electrode. With the method as such, the first area and the second area can be formed in the plate materials in which the first area and the second area are not yet formed.

In the aforementioned method, forming the curved first area in the first plate material and forming the curved second area in the second plate material may include holding and pressurizing the workpiece between a pair of pressing parts. With the method as such, the first area and the second area can be reliably formed.

In the aforementioned method, the pair of pressing parts may be the first electrode and the second electrode. In the method as such, by pressurizing the electrodes towards the workpiece, the curved first area and the curved second area can be formed. Also, the first area and the second area make ideal contact with the leading ends of the respective electrodes. Highly stable welding state can be achieved.

In the aforementioned method, by holding and pressurizing the workpiece between the pair of pressing parts, a gap with a size of 20% or more of a thickness of the first plate material may be formed between the first plate material and the second plate material around a pressurized portion. The method as such can bring the leading end of the electrode into ideal contact with the workpiece.

In the aforementioned method, the plating layer may include aluminum. Since aluminum is easy to alloy, plating easily adheres to the electrode during welding when the plating layer includes aluminum-based material, and life of the electrode is likely to be shortened. However, with the aforementioned method, adverse effects due to adhesion of plating to the electrode can be reduced. Even if the plating layer includes aluminum, life of the electrode can be extended.

In the aforementioned method, the plate material forming the workpiece may be a plate material before undergoing a quenching process. The workpiece before undergoing the quenching process does not have an oxide film. Therefore, plating easily adheres to the electrode, and life of the electrode is likely to be shortened. However, with the aforementioned method, life of the electrode can be extended even in a case where a plate material before undergoing the quenching process is welded.

BRIEF DESCRIPTION OF THE DRAWINGS

An example embodiment of the present disclosure will be described hereinafter with reference to the accompanying drawings, in which:

FIGS. 2A-2D are views explaining a welding process, wherein

FIGS. 3A-3D views explaining the welding process after FIGS. 2A-2D, wherein

FIGS. 4A-4D are views explaining a conventional welding process, wherein

DETAILED DESCRIPTION OF EXEMPLARY EMBODIMENTS

First Embodiment

[1-1. Workpiece and Welding Apparatus]

Figure 1:
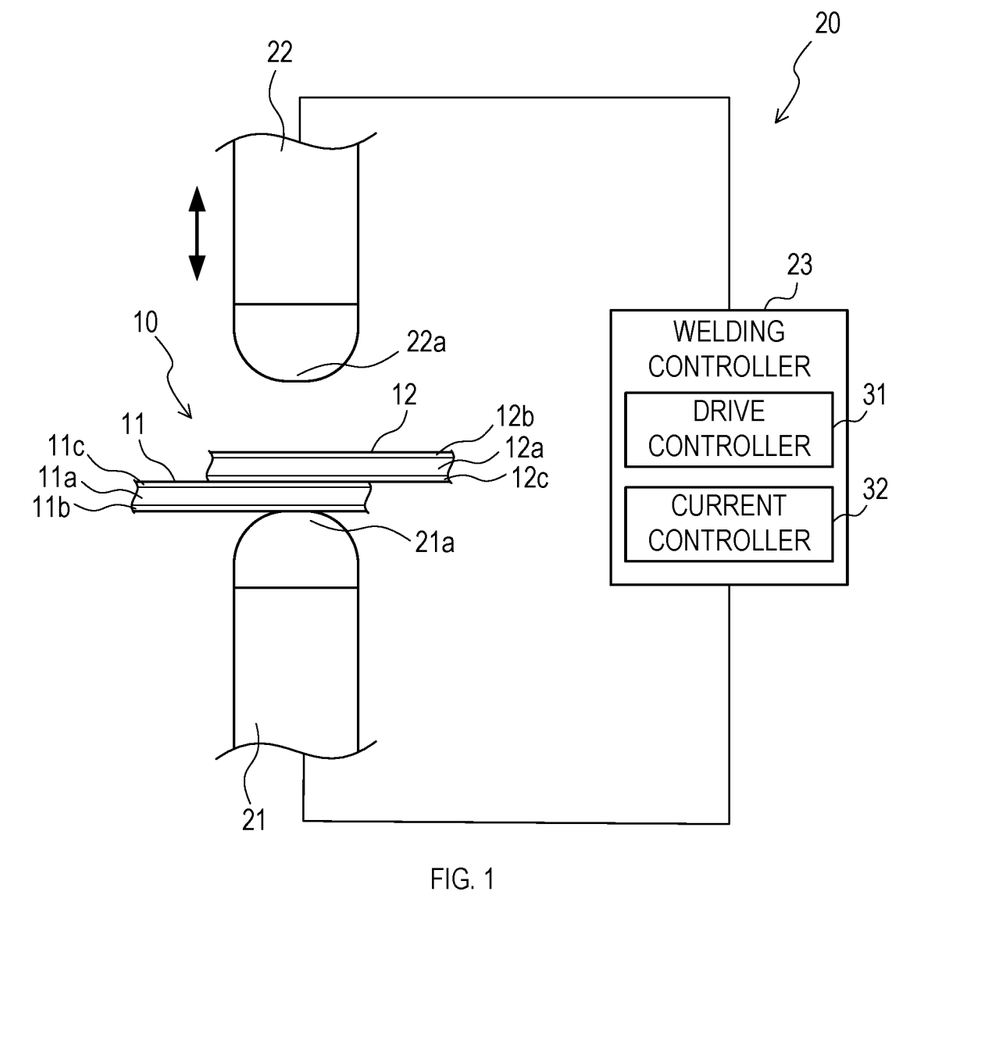
FIG. 1 is a schematic explanatory view of a workpiece and a welding apparatus according to an embodiment.

FIG. 1 shows a workpiece 10 and a welding apparatus 20. The workpiece 10 comprises stacked plate materials. In the present embodiment, the workpiece 10 comprises two stacked plate materials, that is, the first plate material 11 and the second plate material 12. The welding apparatus 20 joins the first plate material 11 and the second plate material 12 by resistance spot welding, using later-described first electrode 21 and second electrode 22, to manufacture a joined member. Hereinafter, the first electrode 21 and the second electrode 22 are simply referred to as "electrode" when indicated without distinction or "electrodes" when both are indicated. In the drawings used for the following description, the workpiece 10 is schematically shown with an end face cut at a portion to be in contact with the electrode.

<Workpiece>

The first plate material 11 comprises a first main body 11a, a first outer plating layer 11b, and a first inner plating layer 11c. The first main body 11a is a main portion of the first plate material 11, and is plate-shaped. The first outer plating layer 11b is formed on one side of the first main body 11a, where the first outer plating layer 11b can make contact with the first electrode 21. The one side is opposite to a side where the second plate material 12 is arranged, of two main sides of the first plate material 11. The first inner plating layer 11c is formed on the other side opposite to the one side of the first main body 11a.

The second plate material 12 comprises a second main body 12a, a second outer plating layer 12b, and a second inner plating layer 12c. The second main body 12a is a main portion of the second plate material 12, and is plate-shaped. The second outer plating layer 12b is formed on one side of the second main body 12a, where the second outer plating layer 12b can make contact with the second electrode 22. The one side is opposite to a side where the first plate material 11 is arranged, of two main sides of the second plate material 12. That is, when the stacked first plate material 11 and second plate material 12 of the workpiece 10 are regarded as one plate, the first outer plating layer 11b is formed on one side of the plate, and the second outer plating layer 12b is formed on the other side of the plate. The second inner plating layer 12c is formed on an opposite side to a side where the second outer plating layer 12b is formed, of the second main body 12a.

The first plate material 11 and the second plate material 12 are plated steel plates, for example, subject for a process called hot stamping (hot pressing). A plating layer is formed so as to provide an anti-rust function to the material. Specific material such as metal that forms the plating layer is not specifically limited. For example, the plating layer may be made from aluminum, zinc, etc. In the present embodiment, the plating layer is made from aluminum. Aluminum plating is excellent in heat resistance, crack resistance, hardenability, etc. The plating layer made from aluminum may include other elements for property improvement. Aluminum is likely to form an alloy with a metal such as copper that constitutes an electrode. Zinc plating may be, for example, either of pure zinc plating and alloy plating.

A quenching process may be performed on the steel plate for strength improvement. For example, quenching may be performed after hot stamping. In the present embodiment, welding of the workpiece 10 formed by plate materials before undergoing the quenching process will be illustrated. Of course, the workpiece 10 may be made of steel plates that have undergone the quenching process.

<Welding Apparatus>

The welding apparatus 20 comprises the first electrode 21 and the second electrode 22 that hold the workpiece 10 from its thickness direction. The welding apparatus 20 also comprises a welding controller 23 that controls a pressurizing force and an energization amount to be applied to the workpiece 10 via the electrodes. The thickness direction is, in other words, a stacking direction of the first plate material 11 and the second plate material 12.

The first electrode 21 and the second electrode 22 are provided in a not shown welding gun with their leading ends opposed to each other. In the present embodiment, the first electrode 21 is fixed to the welding gun. The second electrode 22 is provided in the welding gun in a manner ready to move forward and backward with respect to the first electrode 21 along an axial direction of the second electrode 22. That is, by operation of the second electrode 22, the workpiece 10 is held and pressurized between the first electrode 21 and the second electrode 22. The welding apparatus 20 may be configured to pressurize the workpiece 10 by moving only one of the electrodes as above, or may be configured to pressurize the workpiece 10 by moving both the electrodes.

The first electrode 21 and the second electrode 22 are made of material excellent in electrical conductivity. Material as such includes, for example, copper and copper alloy, but is not limited to these materials. The leading end of each of the first electrode 21 and the second electrode 22 has a rounded shape.

The welding controller 23 comprises a drive controller 31, a current controller 32, and so on. The drive controller 31 is configured to control the pressurizing force acting on the workpiece 10 from the first electrode 21 and the second electrode 22 by moving the second electrode 22 forward and backward. The current controller 32 is configured to control electric current supplied to the first electrode 21 and the second electrode 22.

[1-2. Welding Process]

Figure 2A:
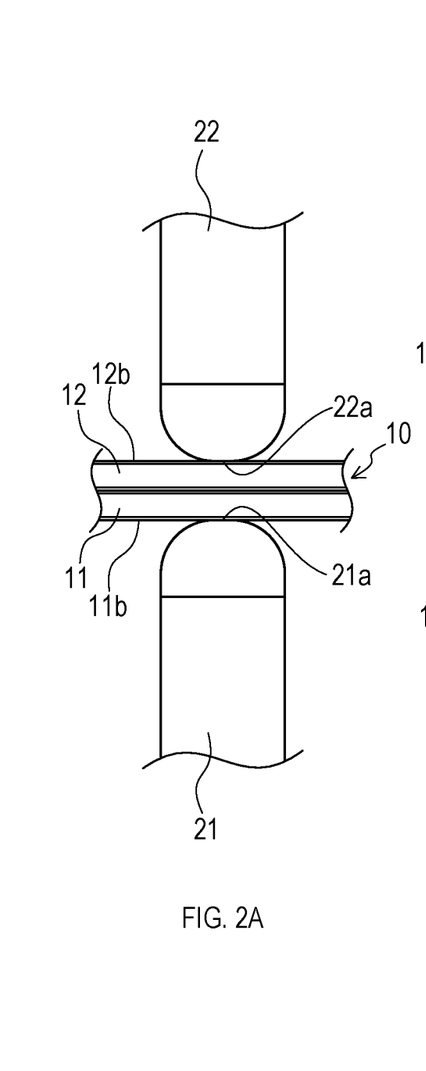
FIG. 2A shows a state before pressurization by a first electrode and a second electrode.

FIG. 2A shows a state in which the workpiece 10 is held between the first electrode 21 and the second electrode 22. At this point, the pressurizing force sufficient to deform the plate materials is not applied to the workpiece 10. Energization to the electrodes is also not performed.

Figure 2B:
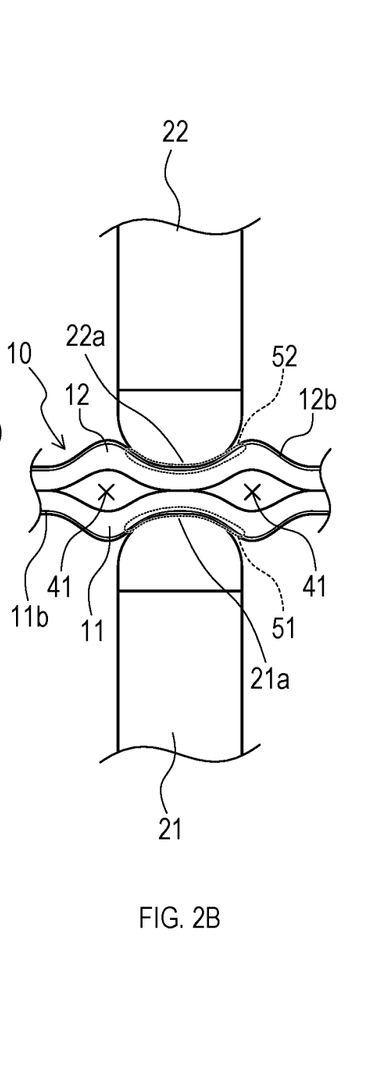
FIG. 2B shows a state after the pressurization.

FIG. 2B shows a step that follows the state in FIG. 2A. Here, the drive controller 31 applies a specific pressure to the second electrode 22 to operate, and pressurizes the workpiece 10. The pressurizing force applied herein is sufficiently larger than a pressurizing force employed in a conventional method, that is, a common pressurizing force applied with the energization. Pressurization with such a large pressurizing force causes large sheet separation without the energization. As a result, the surrounding area of the pressurized portion of each of the first plate material 11 and the second plate material 12 rises outward and is deformed, and gaps 41 are generated between the first plate material 11 and the second plate material 12.

With such pressurized deformation, a curved first area 51 is formed in a portion on the side of the first outer plating layer 11b of the first plate material 1, and a curved second area 52 is formed on the side of the second outer plating layer 12b of the second plate material 12. The first area 51 is concave-curved along the contour of the leading end 21a of the first electrode 21. The second area 52 is concave-curved along the contour of the leading end 22a of the second electrode 22. The first area 51 and the second area 52 are not formed only by the plating layers, but are formed by deformation of the first main body 11a and the second main body 12a which are major portions of the plate material.

At the point where pressurization has been performed as shown in FIG. 2B, the energization is not yet performed. That is, the first area 51 and the second area 52 are formed before energization between the first electrode 21 and the second electrode 22 is started.

Figure 2C:
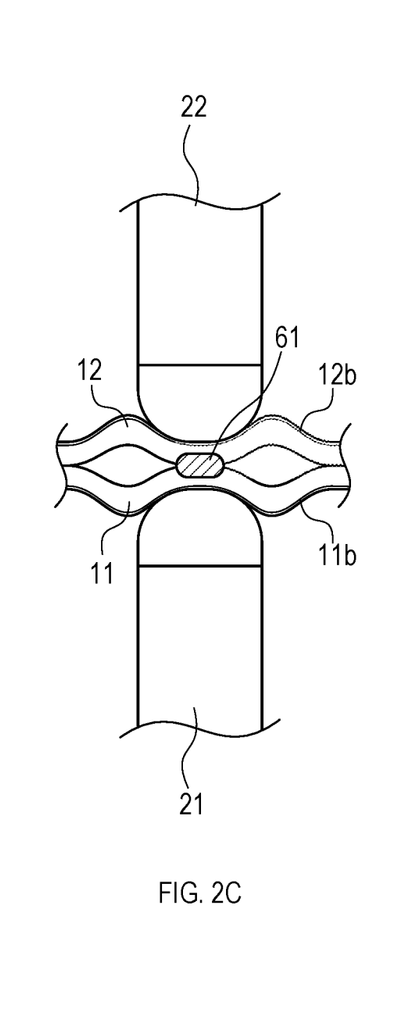
FIG. 2C shows a state after energization between the first electrode and the second electrode.

FIG. 2C shows a step that follows the state in FIG. 2B. Here, a nugget 61 is formed by energization between the first electrode 21 and the second electrode 22. More specifically, in a state in which the first electrode 21 is in contact with the first area 51 and the second electrode 22 is in contact with the second area 52, energization between the first electrode 21 and the second electrode 22 is started to form the nugget 61. As such, a joined member in which the first plate material 11 and the second plate material 12 are joined is manufactured by resistance spot welding.

The first area 51 and the second area 52 have a curved shape along the leading ends of the electrodes. Thus, there is a large area of contact between the electrode and the plate material, as compared to a case where a portion that makes contact with the electrode has a planar shape. When there is a large area of contact, a resistance value during the energization is small. Therefore, an amount of electric current for obtaining a required amount of heat for welding is large, as compared to a case of welding a plate material that makes contact with the electrode at a planar portion.

Figure 2D:
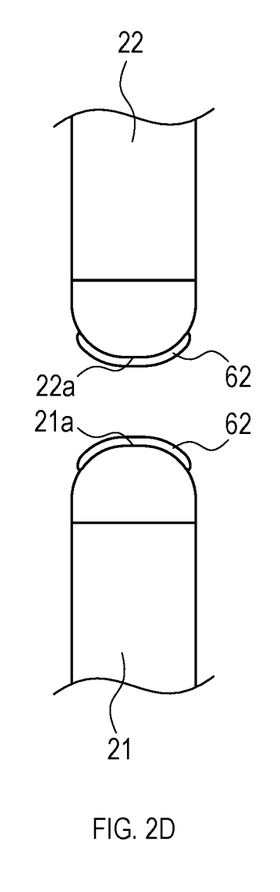
FIG. 2D shows a state after separation of the first electrode and the second electrode from the workpiece.

FIG. 2D shows a state of the electrodes after welding. An adhering material 62 formed by adhesion of melted plating adheres to respective surfaces of the leading end 21a and the leading end 22a. This adhering material 62 can include a metal that constitutes the plating layer, and an alloy of the metal and a metal of the leading end of the electrode. The adhering material 62 adheres to a wide range of each of the leading end 21a and the leading end 21b. This is because the leading end 21a makes wide contact with the first area 51, and the leading end 22a makes wide contact with the second area 52, during the energization.

FIGS. 3A-3D are explanatory views of the subsequent welding process executed with each of the electrodes used for welding in FIGS. 2A-2D.

Figure 3A:
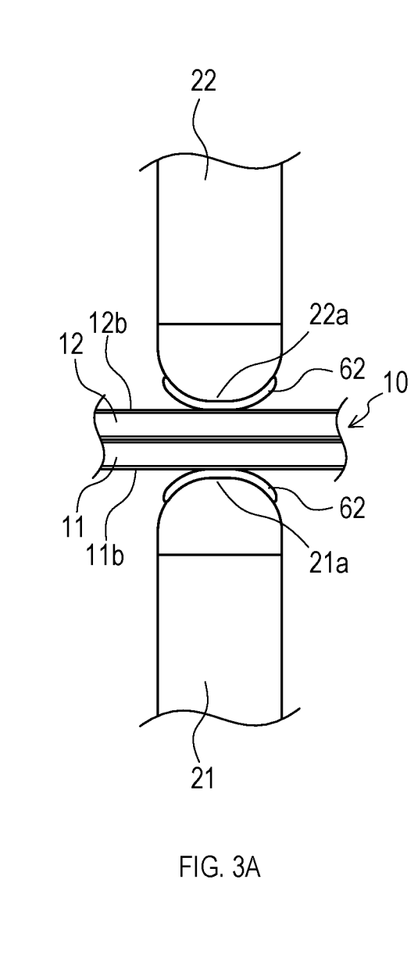
FIG. 3A shows a state before pressurization by the first electrode and the second electrode.

FIG. 3A shows a state in which the workpiece 10 is held between the first electrode 21 and the second electrode 22, as in FIG. 2A. Since the adhering material 62 adheres to the leading end 21a and the leading end 22a, the workpiece 10 and the respective electrodes are in contact via the adhering material 62.

Figure 3B:
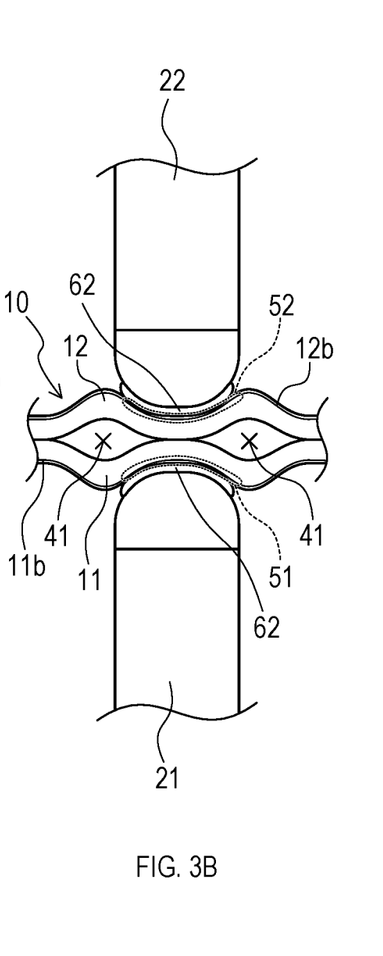
FIG. 3B shows a state after the pressurization.

FIG. 3B shows a state in which the drive controller 31 applies a specific pressure to the second electrode 22 to operate, and pressurizes the workpiece 10, as in FIG. 2B. The workpiece 10 is deformed as in the case described with respect to FIG. 2B, and the concave-curved first area 51 and second area 52 are formed. The first area 51 makes ideal contact with the first electrode 21 via the adhering material 62. The second area 52 makes ideal contact with the second electrode 22 via the adhering material 62. As a result of the energization after the workpiece 10 is deformed by pressurization as such, the nugget 61 is formed as in FIG. 3C.

Figure 3C:
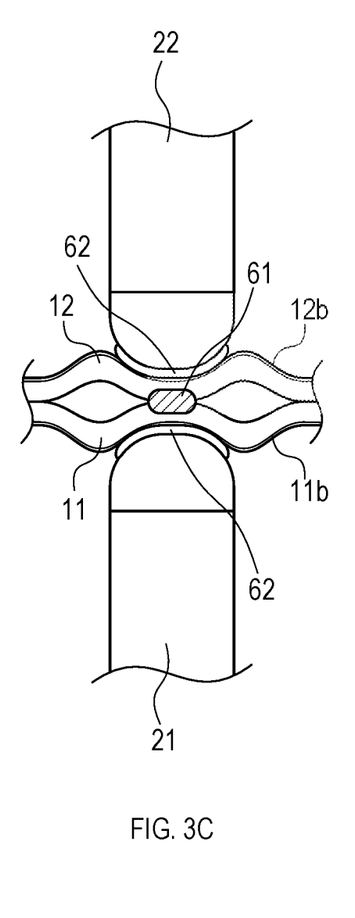
FIG. 3C shows a state after energization of the first electrode and the second electrode.

As shown in FIG. 3C, the first electrode 21 and the second electrode 22 are in contact with the first plate material 11 and the second plate material 12 in a wide range via the adhering material 62. Therefore, as compared to the previous welding shown in FIG. 2C, energization resistance does not largely change, and change in heat generation amount is reduced. Thus, as in the previous time, the nugget 61 suitable for welding can be formed. This effect can be produced even in a state in which the adhering material 62 does not widely adhere to the entire leading end of the electrode, unlike the states shown in FIGS. 2D and 3A-3C. Even if the adhering material 62 adheres only partially to the leading end of the electrode, contact between the electrode and the plate material is facilitated since each of the first area 51 and the second area 52 of the workpiece 10 is curved along the contour of the leading end. As a result, since change in the resistance value is reduced due to the large area of contact as a whole, welding can be ideally performed.

Figure 3D:
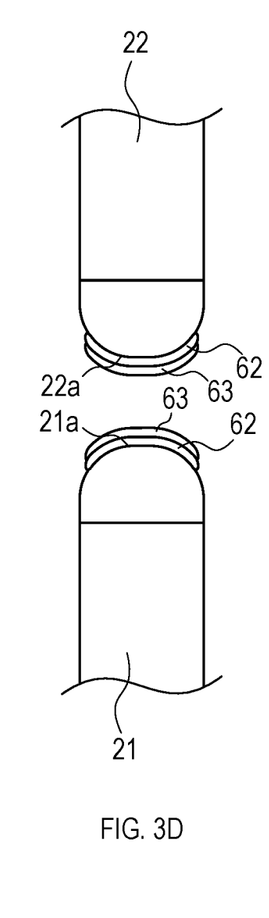
FIG. 3D shows a state after separation of the first electrode and the second electrode from the workpiece.

FIG. 3D shows a state of the electrodes after the second welding. An adhering material 63 newly formed by melted plating adheres on the adhering material 62 on the surface of each of the leading end 21a and leading end 22. The adhering material 63, and adhering materials to be formed along with a later increase in the number of spots, eventually adhere in a manner to expand over the surface of each of the leading end 21a and leading end 21b. Therefore, the first area 51 and the second area 52 of the workpiece 10 being curved along the contour of the leading ends can reduce change in the resistance value.

<Outline of Conventional Welding Process>

Figure 4A:
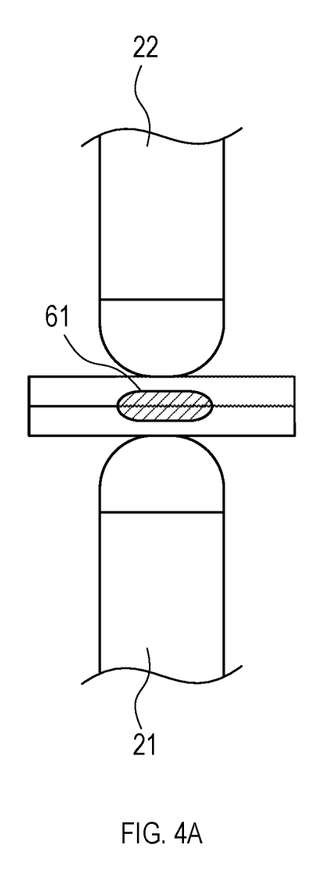
FIG. 4A shows a state during first energization of the first electrode and the second electrode.
Figure 4B:
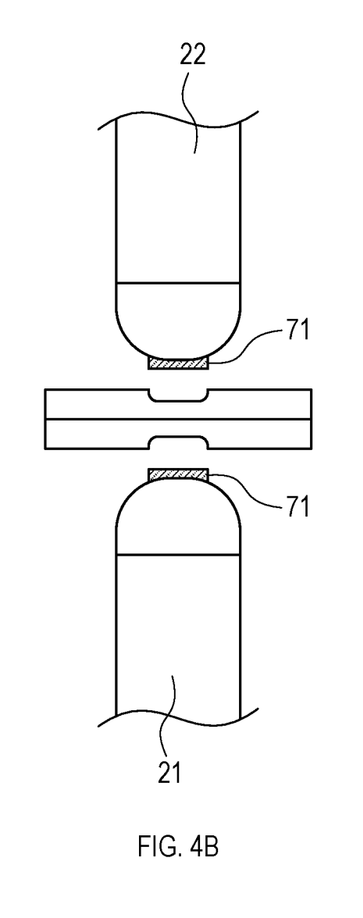
FIG. 4B shows a state when the first electrode and the second electrode are separated from the workpiece.
Figure 4C:
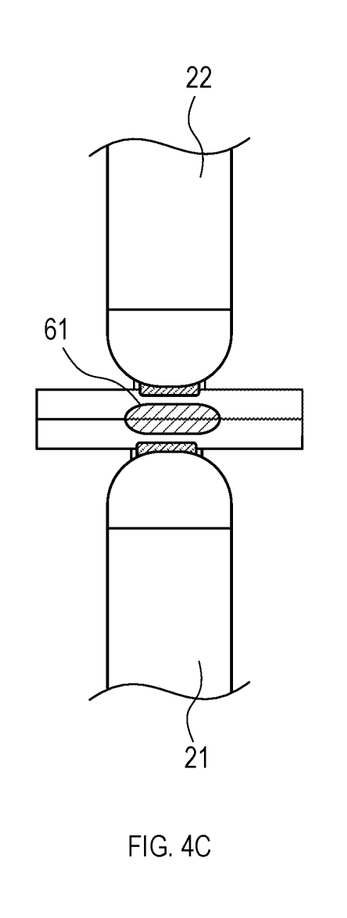
FIG. 4C shows a state during second energization.
Figure 4D:
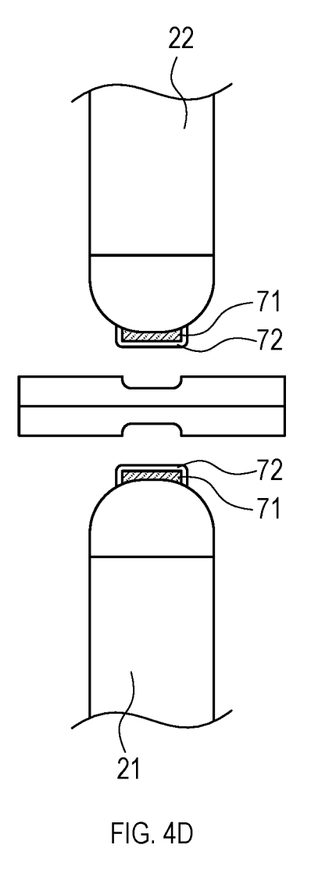
FIG. 4D shows a state when the electrodes are separated from the workpiece after the process in FIG. 4C.

For reference, a conventional welding process will be briefly described. As shown in FIG. 4A, when welding is executed without application of a large pressurizing force to the workpiece by the electrodes, the nugget 61 is formed, and, as shown in FIG. 4B, an adhering material 71 adheres to the leading ends of the electrodes. This adhering material 71 is intensively formed in the center of the leading ends of the respective electrodes. This is the same as in a case where sheet separation occurs due to the energization while a pressurizing force is applied to the workpiece. When the next welding is executed with the leading end as shown in FIG. 4B, the adhering material 71 makes favorable contact with the workpiece, as shown in FIG. 4C. As a result, as shown in FIG. 4D, an adhering material 72 is formed in a manner to cover the adhering material 71, in other words, in a range wider than the adhering material 71. When the adhering materials increase as such, the area of contact between the respective electrodes and the workpiece gradually changes. Along with the change, the resistance value changes and the heat generation amount gradually changes. Thus, insufficient welding and excessive heating occur. Stable welding is deteriorated. For this reason, life of the electrode has been conventionally short. On the other hand, in the configuration of the present embodiment, since the change in the area of contact is reduced, frequency of required treatment is reduced as compared to before, and the life of the electrode becomes longer.

[1-3. Effect]

According to the embodiment detailed in the above, the following effects can be obtained.

(1a) In the method of the present embodiment, welding defects that may occur due to an increase in the number of spots can be reduced, and the life of the electrode can be longer. The reason is described below. Each of the first area 51 and the second area 52 of the workpiece 10 has a shape along the leading end of the electrode. Thus, (i) the leading end of electrode makes favorable contact with the plate material, and (ii) the area of contact between the leading end of electrode and the plate material increases. As for the item (i) above, in a case where the adhering material 62 widely adheres to the leading end of electrode especially as in the present embodiment, the electrode can be in wide contact with the first area 51 or the second area 52 of the plate material via the adhering material 62. If the leading end of the electrode makes favorable contact with the plate material, fluctuation in the area of contact is small. Also, since the area of contact is large as in the item (ii) above, the change in the area of contact, if any, is small. That is, change in the resistance value between the electrode and the workpiece 10 is reduced even by repeated welding. Thus, change in the heat generation amount is reduced. As a result, favorable resistance welding is performed even with the same electrode, and life of the electrode becomes longer.

The contact between the electrode and the workpiece 10 (that is, between the electrode and the plate material, or between the electrode and each of the first and second areas 51, 52) includes a contact between the electrode and the workpiece 10 via plating that adheres to the leading end of the electrode.

The size of the gap 41 that can produce specifically favorable effect is related to a thickness of the plate material. The size of the gap 41 corresponds to the size of the workpiece 10 in the thickness direction. For example, if the size of the gap 41 has 20% or more of the thickness of the first plate material 11, favorable effect is produced to the first electrode 21, and if 30% or more, especially excellent effect is produced. The same applies to the second plate material 12. If the first plate material 11 and the second plate material 12 differ in thickness, the effect produced may differ depending on the plate thickness of each plate material.

(1b) In the method of the present embodiment, pressurizing the electrode toward the workpiece 10 can form the curved first area 51 and the curved second area 52. Also, in this method, each of the first area 51 and the second area 52 makes favorable contact with the leading end of the electrode, and thus a highly stable welding state is achieved. That is, life of the electrode can be further extended.

(1c) In the method of the present embodiment, even with the aluminum plating layer that is likely to generate an alloy with the electrode, welding can be performed while influence on the resistance value due to adhesion of the alloy is reduced. Thus, life of the electrode can be extended.

(1d) The workpiece before undergoing the quenching process is not provided with an oxide film. Thus, plating easily adheres to the electrode, and life of the electrode is likely to be short. However, in the method of the present embodiment, even in a case where the plate material before undergoing the quenching process is welded, life of the electrode can be extended.

2. Other Embodiments

The embodiment of the present disclosure has been described in the above. However, the present disclosure is not limited to the above-described embodiment and can take various modes within the technical scope of the present disclosure.

(2a) The aforementioned embodiment illustrates forming the first area 51 and the second area 52 by operating at least one of the first electrode 21 and the second electrode 22 to pressurize the workpiece 10. However, forming a curved shape along the leading end of the electrode is not limited to the pressurization with the electrodes.

Figure 5:
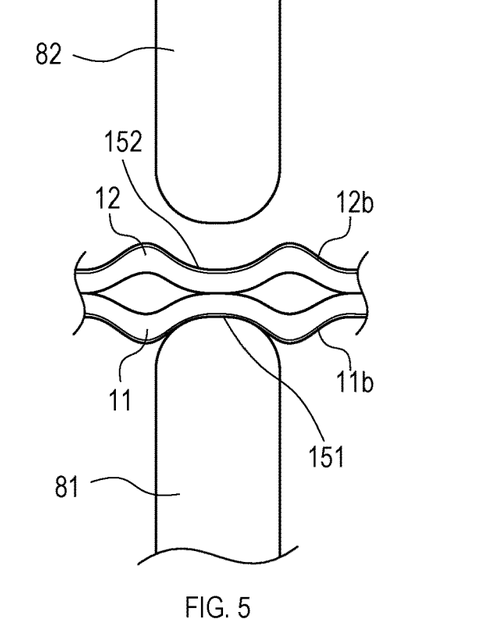
FIG. 5 is a view showing the workpiece in a variation.

For example, as shown in FIG. 5, a press machine or the like may be used so that the first plate material 11 and the second plate material 12 are held and pressurized with a pair of punches 81, 82 and deformed in advance to form the first area 151 and the second area 152. In this case, there is no need to deform the plate material by pressurization with the electrodes. Also, when the electrodes are moved to the first area 151 and the second area 152 for welding, the concave-curved first and second areas 151, 152 guide the leading ends of the electrodes. Thus, welding can be performed at a desired position. The first electrode 21 and the second electrode 22, and the pair of punches 81, 82 are examples of the pair of pressing parts.

Figure 6:
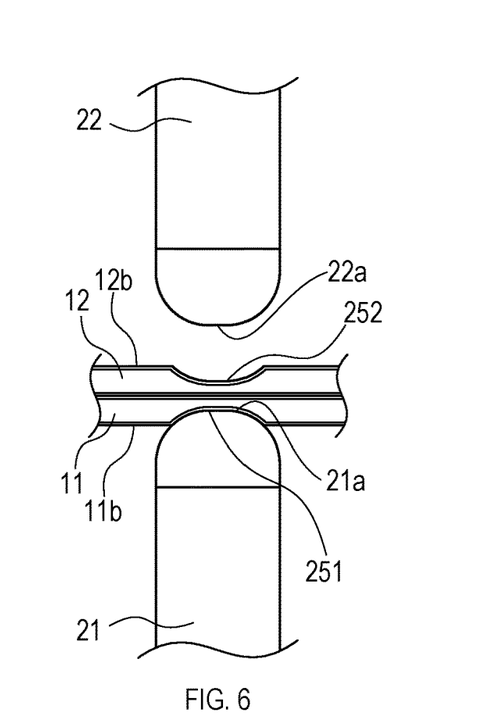
FIG. 6 is a view showing the workpiece in another variation.

Also, as shown in FIG. 6, a recess may be formed in advance in each of the first plate material 11 and the second plate material 12, and the recesses may be the first area 251 and the second area 252. Each of the first area 251 and the second area 252 may have a concave-curved shape along the leading end of the electrode. In this case as well, as in FIG. 5, pressurization for deforming the plate material by the electrodes is no longer necessary, and the leading end can be guided to a welding position.

(2b) In the aforementioned embodiment, the leading end 21a of the first electrode 21 and the leading end 22a of the second electrode 22 have a rounded shape. However, the shape of the leading end is not specifically limited. If a central portion of a contact portion of the leading end with the plate material is the most protruding, and the protrusion decreases toward a peripheral portion, the area of contact can be suitably increased, and a decrease in the resistance value can be sufficiently inhibited. Examples of the aforementioned shape include a rounded shape shown in FIG. 1 and the like, or a cone shape, a conical trapezoidal shape, and so on.

(2c) In the aforementioned embodiment, the curved shape of the first and second areas 51, 52 is formed by pressurization. That is, the first area 51 has a shape that follows the contour of the leading end 21a of the first electrode 21 with high accuracy, and the second area 52 has a shape that follows the contour of the leading end 22a of the second electrode 22 with high accuracy. However, the first area and the second area do not have to have a shape that closely follows the contour of the leading end of the electrode. For example, it is sufficient that at least a recess that surrounds the leading end of the electrode is formed at a stage before energization starts. With the configuration as such, as compared to a case where the plate material that makes contact with the electrode is planar at the stage before energization, the area of contact can be increased. Also, for example, the first area and the second area may have a concave shape that can increase the area of contact at the stage before the energization.

(2d) Functions of one element of the aforementioned embodiment may be performed by elements. One function of one element may be performed by elements. Functions of elements may be performed by one element. One function of elements may be performed by one element. Part of the configurations of the above-described embodiments may be omitted. At least one of the configurations of the above-described embodiments may be added to or replaced with the configurations of the other above-described embodiments.

What is claimed is:

1. A method of manufacturing a joined member, the joined member being manufactured by holding a workpiece comprising stacked plate materials between a first electrode and a second electrode, and applying resistance welding to the workpiece,
   a first plate material in the workpiece that makes contact with the first electrode being provided with a plating layer on a side to be in contact with the first electrode, and a second plate material in the workpiece that makes contact with the second electrode being provided with a plating layer on a side to be in contact with the second electrode,
   the first plate material and the second plate material being included in the stacked plate materials,
   the method comprising:
   pressurizing the workpiece without energization to the workpiece such that a surrounding area of a pressurized portion of the first plate material and a pressurized portion of the second plate material rise outward and are deformed and such that a gap is generated between the first plate material and the second plate material, thereby forming a first area in the first plate material, the first area being curved along a contour of a leading end of the first electrode, and a second area in the second plate material, the second area being curved along a contour of a leading end of the second electrode; and
   in a state in which the first electrode is in contact with the first area in the first plate material and in which the second electrode is in contact with the second area in the second plate material, starting energization between the first electrode and the second electrode to form a nugget.

2. The method according to claim 1, wherein
   forming the curved first area in the first plate material and forming the curved second area in the second plate material includes holding and pressurizing the workpiece between a pair of pressing parts.

3. The method according to claim 2, wherein
   the pair of pressing parts are the first electrode and the second electrode.

4. The method according to claim 2, wherein,
   by holding and pressurizing the workpiece between the pair of pressing parts, a gap with a size of 20% or more of a thickness of the first plate material is formed between the first plate material and the second plate material around a pressurized portion.

5. The method according to claim 1, wherein
   the plating layer includes aluminum.

6. The method according to claim 1, comprising:
   performing the pressurization of the workpiece and the energization between the first electrode and the second electrode and then performing a quenching process on the first and second plate materials.

* * * * *